United States Patent
Subramanian et al.

(10) Patent No.: US 7,476,378 B2
(45) Date of Patent: Jan. 13, 2009

(54) PROCESS FOR PRODUCING TITANIUM DIOXIDE

(75) Inventors: Narayanan Sankara Subramanian, Hockessin, DE (US); Richard P. Bernard, Gulfport, MS (US); Yung-Hsing Samson Hsu, Gulfport, MS (US); Charles David Musick, Waverly, TN (US); Kunle Ogunde, Wilmington, DE (US); James Nelson Tilton, Landenberg, PA (US)

(73) Assignee: E.I. DuPont deNemours & Company, Wilmington, DE (US)

( * ) Notice: Subject to any disclaimer, the term of this patent is extended or adjusted under 35 U.S.C. 154(b) by 551 days.

(21) Appl. No.: 11/260,058

(22) Filed: Oct. 27, 2005

(65) Prior Publication Data

US 2007/0172414 A1 Jul. 26, 2007

(51) Int. Cl.
- *C01G 23/00* (2006.01)
- *C01G 23/047* (2006.01)
- *C01G 23/07* (2006.01)
- *B01J 21/06* (2006.01)
- *B01J 37/07* (2006.01)
- *B01J 37/12* (2006.01)
- *B01J 37/14* (2006.01)

(52) U.S. Cl. .......................... 423/613; 423/69; 423/75; 423/76; 423/79; 423/81; 423/84; 502/350

(58) Field of Classification Search ............. 423/69, 423/75, 76, 79, 81, 84, 613; 502/350
See application file for complete search history.

(56) References Cited

U.S. PATENT DOCUMENTS

| | | |
|---|---|---|
| 2,488,439 A | 11/1949 | Schaumann |
| 2,488,440 A | 11/1949 | Schaumann |
| 2,721,626 A | 10/1955 | Rick |
| 3,078,148 A | 2/1963 | Belknap et al. |
| 3,208,866 A | 9/1965 | Lewis et al. |
| 3,511,308 A | 5/1970 | Nerlinger |
| 3,512,219 A | 5/1970 | Stern et al. |
| 3,647,383 A * | 3/1972 | Farmer et al. ............ 423/613 |
| 3,650,695 A | 3/1972 | Bogdan et al. |
| 3,726,484 A | 4/1973 | Schurr |
| 4,082,692 A | 4/1978 | Goldie |
| 4,462,979 A | 7/1984 | Stevens et al. |
| 4,569,387 A | 2/1986 | Hartmann et al. |
| 4,803,056 A | 2/1989 | Morris et al. |
| 4,937,064 A | 6/1990 | Gonzalez |
| 5,201,949 A | 4/1993 | Allen et al. |
| 5,599,519 A | 2/1997 | Haddow |
| 5,840,112 A | 11/1998 | Morris et al. |
| 5,840,122 A | 11/1998 | Williams |
| 6,145,765 A | 11/2000 | Capelle et al. |
| 6,207,131 B1 | 3/2001 | Magyar et al. |
| 6,350,427 B1 | 2/2002 | Yuill et al. |
| 6,387,347 B1 | 5/2002 | Deberry et al. |

FOREIGN PATENT DOCUMENTS

| | | |
|---|---|---|
| GB | 2 037 266 A | 7/1980 |
| GB | 2269585 | 2/1994 |
| WO | WO1989/11450 | 11/1989 |
| WO | WO1998/04500 | 2/1998 |
| WO | WO 01/07366 A1 | 2/2001 |
| WO | WO 01/60748 A1 | 8/2001 |

OTHER PUBLICATIONS

International Search Report, Nov. 23, 2007.

* cited by examiner

*Primary Examiner*—Timothy C Vanoy
*Assistant Examiner*—Serena L Hanor
(74) *Attorney, Agent, or Firm*—Jessica M. Sinnott

(57) ABSTRACT

This disclosure relates to a process for producing titanium dioxide, comprising:
  a) providing a quantity of liquid titanium tetrahalide for reacting with an oxygen-containing gas;
  b) vaporizing a first portion of the liquid titanium tetrahalide and reacting the titanium tetrahalide vapor and the oxygen-containing gas, in a first stage of a reaction zone, the reaction zone temperature ranging from at least about 650° C.—to form a reaction product at least containing titanium dioxide and oxygen-containing gas and passing the reaction product, more typically in the vapor phase, to at least one additional stage of the reaction zone; and
  c) charging at least one additional portion of the liquid titanium tetrahalide to the at least one additional stage of the reaction zone to cool the titanium dioxide and to react with the oxygen-containing gas to form additional titanium dioxide. This process results in a high conversion to titanium dioxide and formation of titanium dioxide powders having improved particle size and size distribution.

20 Claims, No Drawings

PROCESS FOR PRODUCING TITANIUM DIOXIDE

BACKGROUND OF THE DISCLOSURE

1. Field of the Disclosure

The present disclosure relates to an improved process for making titanium dioxide, and in particular to a process for gas phase oxidation that results in titanium dioxide particles having improved particle size and distribution.

2. Background of the Disclosure

Titanium dioxide pigments have a variety of applications, including coatings, paints, plastics, paper, etc. Light scattering is one of the important properties of these pigments and it is very dependant on particle size and on particle size distribution.

In producing pigmentary titanium dioxide ($TiO_2$), a titanium tetrahalide such as titanium tetrachloride ($TiCl_4$) is reacted in the vapor phase with an oxygen-containing gas in a reactor at a temperature in the range of about 900° to 1600° C. to produce a hot gaseous suspension of $TiO_2$ solid particulates. This oxidation reaction has a high activation energy requiring a significant amount of energy to preheat the reactants. In addition, this reaction is exothermic and results in extremely high temperatures in the reactor causing the titanium dioxide particle growth rate in the reactor to increase. The hot gaseous suspension of titanium dioxide solid particulates must then be quickly cooled below 600° C. within about 1-60 seconds following discharge of the suspension from the reactor. This cooling is accomplished in a conduit, e.g., a flue, which is externally cooled with flowing water so that undesired $TiO_2$ particle size growth is prevented and particle agglomeration is minimized. The titanium dioxide formed can then be subjected to wet treatment, filtration, and drying before the particles are subjected to micronization processes to provide a finished pigment product.

The particle size of the $TiO_2$ pigment can be measured in terms of carbon black undertone (CBU). Pigments containing smaller sized particles have a relatively high CBU, and finished products (e.g., paints, plastics, etc.) containing such pigments tend to have a bluish tint. Pigments with larger sized particles have a relatively low CBU and finished products containing such pigments tend to have a more yellowish tint. The particle agglomeration of the pigment is typically measured in terms of its particle size distribution (coarse tail). Pigments, wherein a low weight percentage of the particles (e.g., less than 30%) have a particle diameter size greater than 0.6 microns, tend to have low particle agglomeration and finished products made with such pigments tend to have high gloss. Pigments, wherein a high weight percentage of the particles have a particle diameter size greater than 0.6 microns, tend to have greater particle agglomeration and finished products made with such pigments tend to have less gloss.

A need exists for an improved energy efficient process that results in particles having an improved size and size distribution.

A process for controlling the formation of titanium dioxide particles in a multi-stage vapor-phase oxidation reactor has been proposed wherein the fraction of gaseous titanium tetrachloride converted to titanium dioxide in a first stage is limited and the remaining fraction of the gaseous titanium tetrachloride is introduced in a subsequent stage for reaction with unreacted oxygen of the first stage. While the process is said to facilitate titanium dioxide particle size control and particle size distribution, process inefficiencies associated with obtaining and maintaining the titanium tetrachloride feed in the gas phase, employing separate facilities for converting the liquid feed into gas or employing one such facility but then separating the gaseous feed and controlling the proportion of gaseous titanium tetrachloride introduced to the different stages are significant drawbacks.

SUMMARY OF THE DISCLOSURE

In a first aspect, the disclosure provides a process for producing titanium dioxide ($TiO_2$), preferably $TiO_2$ pigment, comprising:

a) providing a quantity of liquid titanium tetrahalide for reacting with an oxygen-containing gas;

b) vaporizing a first portion of the liquid titanium tetrahalide and reacting the titanium tetrahalide vapor and the oxygen-containing gas, in a first stage of a reaction zone, the reaction zone temperature being sufficient, preferably ranging from at least about 650° C., to form a reaction product at least containing titanium dioxide and oxygen-containing gas, and passing the reaction product, more typically in the vapor phase, to at least one additional stage of the reaction zone; and c) charging at least one additional portion of the liquid titanium tetrahalide directly into the at least one additional stage of the reaction zone at a temperature below the boiling point of the titanium tetrahalide, at the charge pressure of the titanium tetrahalide, to cool the titanium dioxide and to react with the oxygen-containing gas to form additional titanium dioxide under conditions sufficient to form a product being substantially free of titanium tetrahalide.

In a second aspect, the disclosure provides a titanium dioxide powder having a CBU of about 7 to about 30, prepared by a process comprising:

a) providing a quantity of liquid titanium tetrahalide for reacting with an oxygen-containing gas;

b) vaporizing a first portion of the liquid titanium tetrahalide and reacting the titanium tetrahalide vapor and the oxygen-containing gas, in a first stage of a reaction zone, the reaction zone temperature ranging from at least about 650° C.,—to form a reaction product at least containing titanium dioxide and oxygen-containing gas and passing the reaction product to at least one additional stage of the reaction zone; and c) charging at least one additional portion of the liquid titanium tetrahalide directly into the at least one additional stage of the reaction zone at a temperature below the boiling point of the titanium tetrahalide, at the charge pressure of the titanium tetrahalide, to cool the titanium dioxide and to react with the oxygen-containing gas to form additional titanium dioxide under conditions sufficient to form a product being substantially free of titanium tetrahalide.

The process of the instant disclosure overcomes the problems associated with using a gaseous titanium tetrahalide in a downstream stage of the reaction zone especially the costs of obtaining and maintaining the titanium tetrahalide halide feed in the gas phase and separately feeding more than one gaseous titanium tetrahalide stream. Aside from the foregoing problems, gaseous titanium tetrahalide would avoid unreacted titanium tetrahalide in the product. Problems of unreacted titanium tetrahalide include high pressure drops in the bag filters, rate loss, and blower damage. However, the disclosure provides a process which uses liquid titanium tetrahalide in an additional stage of the reaction zone to achieve particle size control and particle size distributions in a manner that avoids substantial amounts of unreacted titanium tetrahalide in the product. An additional advantage of using the heat of vaporization of the liquid titanium tetrahalide is directly cooling the reaction product of the first stage of the reaction zone.

This process provides a high conversion to titanium dioxide and formation of titanium dioxide powders having improved particle size and size distribution.

DETAILED DESCRIPTION OF THE DISCLOSURE

The production of $TiO_2$ pigment by vapor phase oxidation of a tetrahalide, particularly titanium tetrahalide, in the presence of a nucleant is known and disclosed in Lewis et al., U.S. Pat. No. 3,208,866 and Allen et al., U.S. Pat. No. 5,201,949, the disclosures of which are incorporated herein by reference. The present disclosure relates specifically to an improvement in the aforementioned processes.

In the production of $TiO_2$ pigment by the vapor phase oxidation of titanium tetrahalide, various titanium tetrahalides such as titanium tetrachloride ($TiCl_4$), titanium tetrabromide, and/or titanium tetraiodide may be used, but it is preferable to use $TiCl_4$. First, titanium tetrahalide is evaporated and preheated to temperatures of from about 300 to about 650° C. The titanium tetrahalide can be heated by any suitable means including an indirect fired heater burning natural gas. The vaporized titanium tetrahalide is introduced into a first stage of a reaction zone of a reaction vessel. Rutile forming agents such as aluminum halides, selected from the group of $AlCl_3$, $AlBr_3$ and/or $AlI_3$, that are present in amounts sufficient to provide about 0.5 to about 10% $Al_2O_3$, typically about 0.5 to about 5%, and more typically about 0.5 to about 2% by weight, based on total solids formed in the oxidation reaction, can be thoroughly mixed with the titanium tetrahalide prior to its introduction into the reaction zone of the reaction vessel. Typically, $AlCl_3$ is used in the process of this disclosure. However, it is also recognized that other co-oxidants and rutile promoters may be added at this point or further downstream in the process. The titanium halide vapor can be mixed with halide, such as $Cl_2$, and fed through a bed containing metallic aluminum to provide the rutile-forming agent. Additional heat of reaction can be provided by the reaction between the halide and the aluminum.

The oxygen-containing gas is preheated to at least 1200° C. and is continuously introduced into the first stage of the reaction zone through a separate inlet from the inlet for the titanium tetrahalide feed stream. By "reaction zone", it is meant the length of the reactor in which substantial reaction of the reactants takes place. The reaction of oxygen and titanium tetrahalide in the vapor phase is extremely fast and is followed by a brief period of particle growth. The oxygen containing gas which is introduced into the reaction zone may contain a nucleant. By "nucleant", it is meant any substance which can reduce the particle size of the pigment such as metals, oxides, salts, or other compounds of sodium, potassium, lithium, rubidium, cesium, calcium, barium, strontium, or mixtures thereof. The salts, CsCl, KCl and CsCOOH, are typical for use in this disclosure. Typically, the oxygen-containing gas is introduced into the first stage of the reaction zone simultaneously with the titanium tetrahalide vapor.

The pressure for carrying out the oxidation reaction can be conducted below atmospheric pressure, but is typically operated above 10 pounds per square inch gage (psig). The upper pressure limit may be the practical upper limit of the process, e.g., typically about 200 psig. The residence time of the reactants in the mixing zone of the reactor may be at least 1 millisecond, typically at least 3 milliseconds. The maximum residence time may be about 25 milliseconds. Typically, the residence time is in the range of about 1 to about 25 milliseconds. By "mixing zone", it is meant the length of the reactor in which substantial mixing of the reactants takes place. The reaction temperature may be at least 650° C., and typically in the range of about 700° to about 1800° C., and more typically from about 900° C. to about 1600° C. Typically, the reaction occurs in the presence of water vapor.

The reaction product, more typically in the vapor phase, is passed to at least one additional stage of the reaction zone wherein at least one additional portion of titanium tetrahalide in the form of a liquid is added to the reaction zone. Typically, about one to about five additional portions of liquid titanium tetrahalide may be added to about one to about five additional stages, more typically one additional portion of liquid titanium tetrahalide may be added to one additional stage. The liquid titanium tetrahalide may be atomized before addition using techniques known to one skilled in the art. Typically, an atomization fluid such as nitrogen, argon, carbon dioxide, or chlorine may be used to accomplish the atomization. The atomization can also be accomplished through an atomizing nozzle. Suitable atomizing nozzles are well known in the art of spraying liquid streams into reactors, including high temperature reactors. This results in some cooling of the reaction product formed in the first stage and reacting the liquid titanium tetrahalide with the oxygen containing gas to form additional titanium dioxide. The titanium tetrahalide added in liquid form in the additional stage can range from about 5 to about 90%, more typically about 20 to about 70%, even more typically from about 20 to about 50% of the total quantity of titanium tetrahalide used in the process. The amount of liquid titanium tetrahalide used in this additional stage can exceed about 70% if a plurality of injection points are used. The theoretical maximum can be as high as 90% of the liquid injection if injected in a plurality of locations, typically two locations and typically by injecting 45% at each of two locations.

Multistage reactors such as those disclosed in U.S. Pat. No. 3,512,219 may be used provided they are modified to accommodate the addition of liquid titanium tetrahalide in at least one additional reaction zone, i.e., the second or subsequent stages of the reaction zone.

The conditions for reaction of liquid titanium tetrahalide with oxygen are sufficient to form a product being substantially free of titanium tetrahalide. The conditions can typically provide greater than 99% conversion of all the titanium tetrahalide added to the reactor to titanium dioxide. The titanium dioxide conversion can depend on the balance between the amount of liquid titanium tetrachloride injected and the degree of atomization. A higher rate of liquid titanium tetrahalide can be added if charged to the reactor as a very fine spray. If larger droplets of the titanium tetrahalide are charged then a lower rate of liquid titanium tetrachloride is needed to reduce the quantity of titanium tetrachloride in the product. To ensure the addition of liquid TiCl4 to the reactor, the boiling point of titanium tetrachloride can be caculated by the following equation:

$$\text{Vapor Pressure of } TiCl_4 = 10^{(6.694 - (1287.91/(T+201.2)))}$$

Where, Vapor Pressure is calculated in mm Hg, and T is the temperature of liquid titanium tetrachloride in degrees Celsius.

Thus, using the equation above, for a reactor operating at 262 mm Hg (5 psia) the temperature of liquid titanium tetrachloride is below 100° C. Using the equation above for higher pressure operation of 10,420 mm Hg (200 psia), the titanium tetrachloride temperature can be below 280° C. while remaining in the liquid phase. Even though it is possible to use temperatures near the boiling point, lower temperature titanium tetrahalide is preferred due to the direct cooling to the reaction mass.

The actual injection point for the titanium tetrachloride can vary depending upon process operation and reactor configuration including, by way of example only, reactor diameters and flow rates.

The reaction mass at the point for introducing liquid titanium tetrahalide can range in temperature from about 900° C. to about 1700° C., typically from about 1300° C. to about 1600° C.

The hot gaseous suspension of $TiO_2$ particulate may then be rapidly cooled in order to prevent undesirable particle growth. In accordance with this disclosure, cooling of the hot gaseous suspension may be performed by methods known in the art. These methods typically involve passing the hot gaseous suspension through a cooling conduit having relatively cool walls in comparison to the gaseous suspension. The walls of the conduit may typically be cooled by passing cool fluid externally over the walls. For example, the conduit may be immersed in cool water. Various forms of conduits or flues which are typically cooled by water externally, may be used in the process of this disclosure. Examples include, but are not limited to, conventional round pipes and conduits which are described in greater detail in U.S. Pat. Nos. 2,721,626; 3,511,308; 4,462,979; 4,569,387; and 4,937,064 (finned flue). As the hot $TiO_2$ particles come in contact with the relatively cooler surfaces of the inner walls, the particles deposit on the walls and cool to form adherent layers. These deposits and scale may reduce the cooling rate of the reaction mass thereby affecting the quality of the pigment formed.

Granular scouring material may be introduced into the conduit, to remove the $TiO_2$ deposits and substantially improve the quality of pigment formed.

In this disclosure, the particles of the scouring material typically can have a diameter (size distribution) in the range from about 60 mesh (0.0098 inches or 0.250 mm) to about 0.5 inches (12.7 mm). Typically at least 80% of the particles will be of a size 10 mesh (0.0787 inches or 2.00 mm) or larger. More typically at least 90% of the scouring material particles will be of a size 10 mesh or larger. The scrubbing action of the scouring material is dependant on their particle size distribution. If the particle size is too small, this will result in the scouring material not providing the required scrubbing action. If the particle size is too large, this may cause feeding problems and insufficient surface area to provide the scrubbing required.

The amount of scouring material used is variable and will depend upon the particular needs. Typically, the addition of an amount of scouring material ranging from about 0.5 to about 20 wt. % scouring material, typically from about 3 to 10 wt. %, based on total $TiO_2$ suspended solids will be found adequate to effect the desired removal of accumulated pigment deposits and will allow a relatively high, uniform rate of heat removal from the product stream. It will be appreciated by those skilled in the art that enough scouring material must be added to bring the reaction mass at the end of the conduit to a temperature compatible with downstream process equipment such as cyclones, filters, screw conveyers, etc. Such temperatures may be in the range of about 100° to about 600° C.

The scouring material may be added to the conduit by any suitable means. For example, the scouring material may be added intermittently or continuously by gravity from a hopper (or bin) through a solids metering valve to the flue. Continuous feeding to the $TiO_2$ suspension under treatment is typical. The scouring material may be added at any convenient point in the system but are most conveniently added at the front end of the conduit as the product stream discharges from the reactor. Further, the scouring material may be added at multiple addition points and especially at those points adjacent to which a relatively severe build-up occurs due to the configuration of the apparatus, such as at return or other forms of bends employed in the system.

In the present disclosure, process variables such as pressure, reaction temperature, nucleant level and rate of scouring material addition can be adjusted to achieve desired pigment properties such as CBU or agglomeration extent over a wide range of production rates.

The titanium dioxide particles along with the scouring material are then separated from the vapor phase by techniques known to one skilled in the art. In a specific embodiment a cyclone may be used to achieve this separation. The titanium dioxide particles and the scouring material obtained are in powder form.

The titanium dioxide particles may be separated from the scouring material, if needed, and then the particles are subjected to particle size reduction whereby the titanium dioxide particles and the scouring material are typically reduced to a particle size of about 50 nm to about 1000 nm, and more typically about 100 nm to about 250 nm. Particle size reduction may be accomplished in a fluid energy mill. Some suitable fluid energy mills are disclosed in U.S. Pat. Nos. 3,726,484 (Schurr) and 6,145,765 (Capelle). Some suitable fluid energy mills may be obtained from Fluid Energy Processing & Equipment Company, Hatfield, Pa., or from Hosokawa Micron Powder Systems, Summit, N.J. or Sturtevant, Inc., Hanover, Mass. Grinding aids such as TMP (Trimethylolpropane), chemical structure=C2H5C(CH2OH)3 and TEA (Triethanolamine), chemical structure=(HOCH2CH2)3N, may be used to improve grinding efficiency.

Typically, the titanium dioxide powder prepared by this process has a CBU of about 7 to about 30. The powders formed may be used in any fashion known to one skilled in the art. For example, slurries may be prepared using the titanium dioxide powders prepared using the process of this disclosure. Surface treatment may also be provided to enhance the properties of the so prepared powders.

The present disclosure is further illustrated by the following examples, but these examples should not be construed as limiting the scope of the disclosure.

Test Methods:

Carbon Black Undertone

The carbon black undertone (CBU) of a $TiO_2$ pigment sample was measured according to the methods described in U.S. Pat. Nos. 2,488,439 and 2,488,440, the disclosures of which are hereby incorporated by reference, using a benchmark value of 10 rather than 100 as used in the patents. The CBU was measured by mulling together a suitable liquid, such as light colored oil, the $TiO_2$ pigment sample, and carbon black. The mixture was spread on a panel and the relative blueness of the gray mixture was observed. Pigments containing smaller sized particles have a relatively high CBU and a bluer undertone. Pigments with larger sized particles have a relatively low CBU and have a more yellowish undertone.

Coarse Fraction

The coarse fraction of the product of the Examples was measured by a Sedigraph 5100, (manufactured by Micromeritics Instrument Corp, Norcross, Ga.) after dispersion in aqueous suspension by fixed level sonication.

EXAMPLES

Example 1

Liquid titanium tetrachloride was vaporized by heating to 350° C. using an indirect fired heater burning natural gas at 9700 standard cubic feet per hour, then mixed with $Cl_2$ and fed through a bed containing aluminum metal. titanium tetrachloride vapor was heated from the reaction between $Cl_2$ and aluminum to about 415° C. and continuously admitted to a reaction chamber. Simultaneously, oxygen, preheated to 1540° C. containing trace amounts of KCl was continuously admitted to the same reaction chamber through a separate inlet. The production rate was 12 tons $TiO_2$ per hour. The gaseous suspension of $TiO_2$ was then quickly cooled in the flues and separated by conventional means. The pigment produced was analyzed and had a carbon black undertone of 9.9 and a coarse fraction of 19.7% greater than 0.6 microns.

At a location approximately 7 feet from the point where the gaseous titanium tetrachloride and oxygen were initially contacted, a portion of the liquid titanium tetrachloride feeding the vaporizer was diverted and fed as a liquid to the reaction mass from the first stage of the reactor. The reaction mass temperature prior to liquid titanium tetrachloride injection was about 1500° C. The liquid titanium tetrachloride had a flow of 130 KG/min, a temperature of 37° C. and was fed through a ¾" diameter nozzle with 60 scfm of nitrogen added for atomization. The natural gas feeding the indirect fired heater fell to 7100 standard cubic feet per hour. The pigment produced was analyzed and had a carbon black undertone of 12.4 and a coarse fraction of 16.3% greater than 0.6 microns. The quantity of the titanium dioxide produced indicated that complete conversion of the titanium tetrachloride to TiO2 was achieved.

Example 2

Example 1 was repeated with the following exceptions: The liquid titanium tetrachloride had a flow of 80 KG/min, a temperature of 37° C. and was fed through a ¾" diameter nozzle with 50 scfm of nitrogen added for atomization. The natural gas feeding the indirect fired heater fell to 6200 standard cubic feet per hour. The pigment produced was analyzed and had a carbon black undertone of 14.4 and a coarse fraction of 12.2% greater than 0.6 microns. The quantity of the titanium dioxide produced indicated complete conversion of the titanium tetrachloride to TiO2 was achieved.

The natural gas feeding the indirect fired heater fell to 7100 scfh in Example 1 and 6200 scfh in Example 2 which showed that less energy was needed to produce $TiO_2$. It also demonstrated that less $TiCl_4$ was being vaporized.

Comparative Example 3

Example 1 was repeated with the following exceptions: The total production rate was 11.5 tons $TiO_2$ per hour. The liquid titanium tetrachloride had a flow of 174 KG/min, a temperature of 34° C. and was fed through a ¾" diameter nozzle with 60 scfm of nitrogen added for atomization. The natural gas feeding the indirect fired heater fell to 5100 standard cubic feet per hour. The quantity of $TiO_2$ produced indicated that, at the higher flow rate of this Example, only 80% conversion of $TiCl_4$ to $TiO_2$ was achieved.

What is claimed is:

1. A process for producing titanium dioxide, comprising:
   a) providing a quantity of liquid titanium tetrahalide for reacting with an oxygen-containing gas;
   b) vaporizing a first portion of the liquid titanium tetrahalide and reacting the titanium tetrahalide vapor and the oxygen-containing gas, in a first stage of a reaction zone, the reaction zone temperature being sufficient to form a reaction product at least containing titanium dioxide and oxygen-containing gas and passing the reaction product to at least one additional stage of the reaction zone; and
   c) charging at least one additional portion of the liquid titanium tetrahalide directly into the at least one additional stage of the reaction zone at a temperature below the boiling point of the titanium tetrahalide, at the charge pressure of the titanium tetrahalide, to cool the titanium dioxide and to react with the oxygen-containing gas to form additional titanium dioxide, under conditions sufficient to form a product substantially free of titanium tetrahalide.

2. The process of claim 1 wherein the titanium dioxide is a pigment.

3. The process of claim 1 wherein about 1 to about 5 additional portions of the liquid titanium tetrahalide are charged to the additional stage.

4. The process of claim 3 wherein one additional portion of the liquid titanium tetrahalide is charged to the additional stage.

5. The process of claim 1 wherein the at least one additional portion of the liquid titanium tetrahalide is atomized.

6. The process of claim 5 wherein the atomization is accomplished with nitrogen, argon, carbon dioxide, or chlorine.

7. The process of claim 5 wherein the atomization is accomplished using an atomizing nozzle.

8. The process of claim 1 wherein the additional portion of the liquid titanium tetrahalide ranges from about 5 to about 90%, of the total quantity of the titanium tetrahalide provided.

9. The process of claim 8 wherein the additional portion of the liquid titanium tetrahalide is about 20 to about 70% of the total quantity of the titanium tetrahalide provided.

10. The process of claim 1 wherein the titanium tetrahalide is titanium tetrachloride.

11. The process of claim 10 wherein the first portion of the liquid titanium tetrahalide further comprises a rutile forming agent.

12. The process of claim 11 wherein the rutile forming agent is aluminum halide.

13. The process of claim 12 wherein the aluminum halide is aluminum chloride.

14. The process of claim 10 wherein the liquid titanium tetrachloride is charged to the additional stage of the reaction zone at a temperature below the vapor pressure of the titanium tetrachloride determined by the equation:

$$\text{Vapor Pressure of TiCl4} = 10(6.694 - (1287.91/(T+201.2)))$$

wherein, Vapor Pressure is calculated in nit Hg, and T is the temperature of liquid titanium tetrachloride in degrees Celsius.

15. The process of claim 1 wherein the oxygen-containing gas further comprises a nucleant.

16. The process of claim 15 wherein the nucleant is selected from KCl, CsCl and CsCOOH.

17. The process of claim 1 further comprising a pressure for carrying out the oxidation reaction of below atmospheric pressure.

18. The process of claim 1 further comprising a pressure for carrying out the oxidation reaction of about 10 psig to about 200 psig.

19. The process of claim 1 wherein the reaction zone temperature ranges from at least about 650° C. to about 1800° C.

20. The process of claim 1 wherein the reaction product from step b) is in the vapor phase.

* * * * *